(No Model.) 2 Sheets—Sheet 1.

M. FLAMMANG.
PANORAMIC CAMERA.

No. 527,841. Patented Oct. 23, 1894.

WITNESSES:
Anthony Jones
William M. Iliff

INVENTOR
Mathias Flammang
BY Edwin H. Brown
his ATTORNEY (No Model.) 2 Sheets—Sheet 2.
M. FLAMMANG.
PANORAMIC CAMERA.
No. 527,841. Patented Oct. 23, 1894.
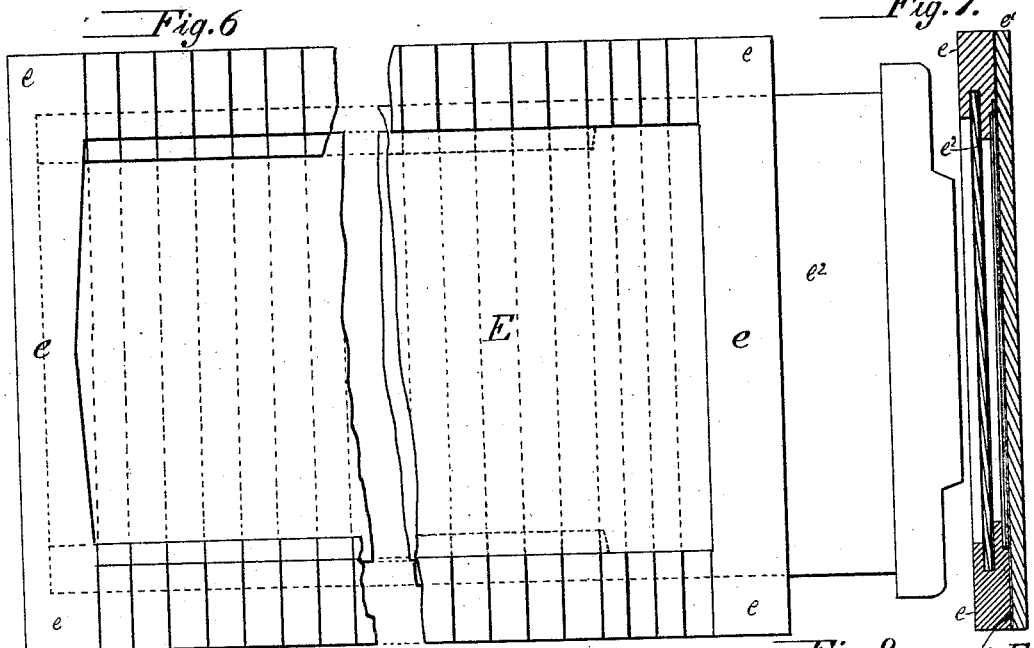
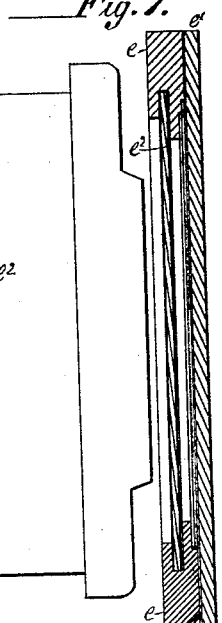
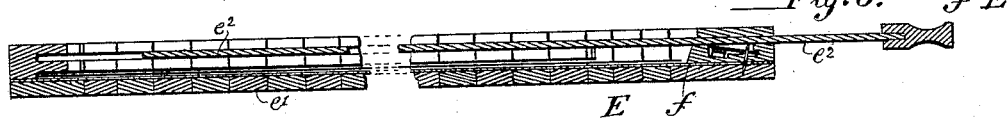
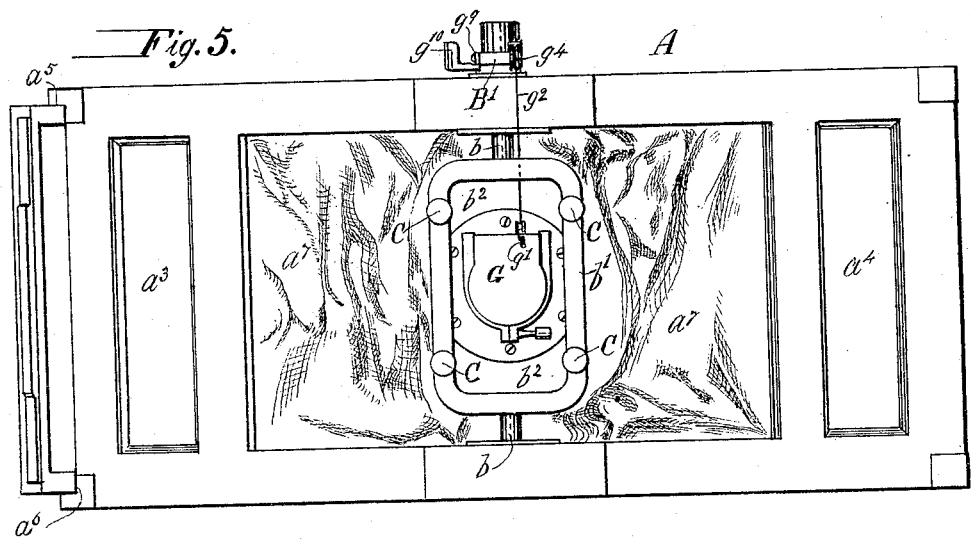
WITNESSES:
INVENTOR
Mathias Flammang
BY Edwin H. Brown
his ATTORNEY

UNITED STATES PATENT OFFICE.

MATHIAS FLAMMANG, OF NEWARK, NEW JERSEY, ASSIGNOR TO THE SCOVILL & ADAMS COMPANY, OF CONNECTICUT.

PANORAMIC CAMERA.

SPECIFICATION forming part of Letters Patent No. 527,841, dated October 23, 1894.

Application filed September 22, 1893. Serial No. 486,168. (No model.)

*To all whom it may concern:*

Be it known that I, MATHIAS FLAMMANG, of Newark, Essex county, and State of New Jersey, have invented a certain new and useful Improvement in Panoramic Cameras, of which the following is a specification.

I will describe a camera, embodying my improvement and then point out the novel features in the claims.

My improvement relates particularly to panorama photographic cameras, adapted to take either a number of views in succession by a step-by-step oscillation of a focusing chamber relatively to a fixed camera body and the reception of the image on a suitably located sensitive surface, thus forming a picture at each stop, or for taking one long panoramic view by sweeping a focusing chamber relatively to a fixed camera body.

Figure 1:
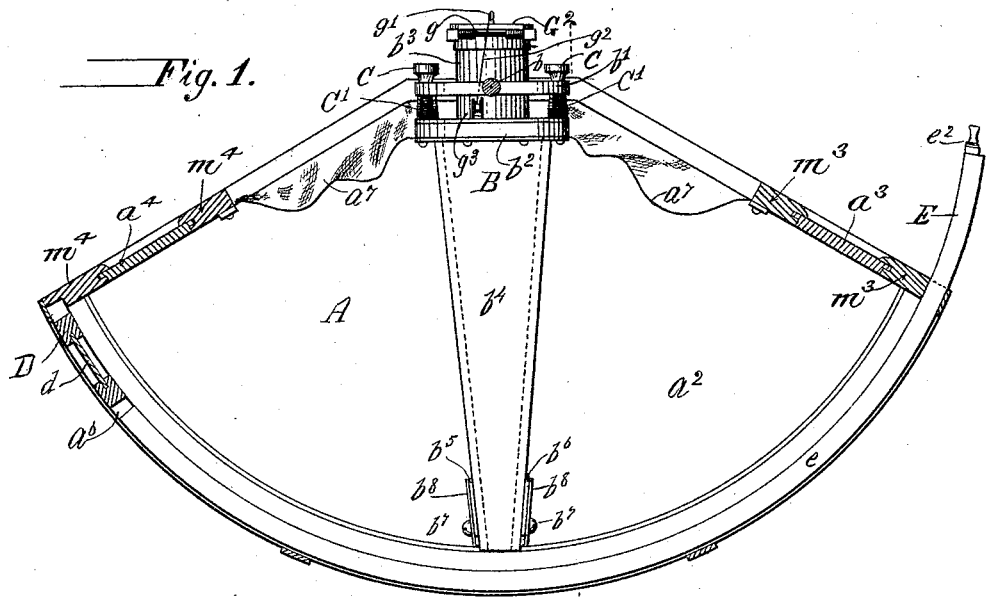
Figure 4:
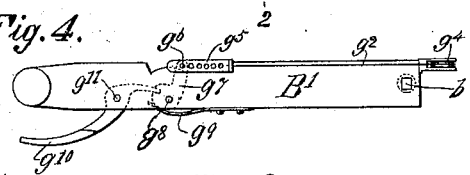
Figures 2, 3:
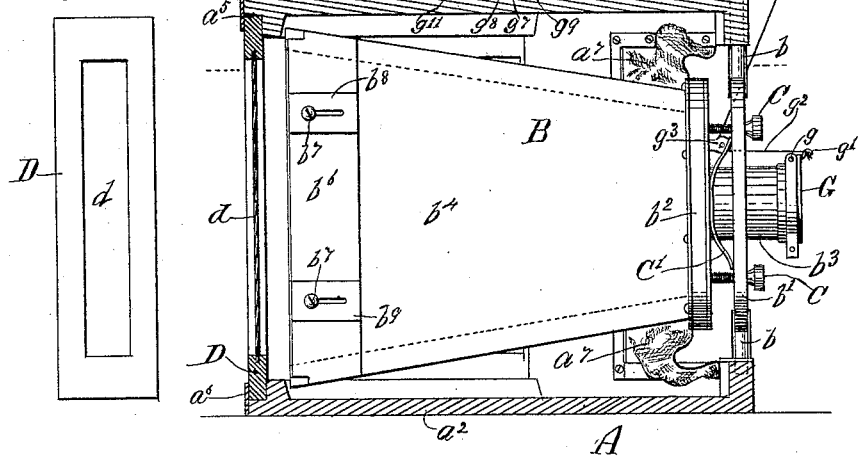

In the accompanying drawings Figure 1 is a partly sectional plan of a photographic camera, embodying my improvement. Fig. 2 is a vertical section taken at the plane of the dotted line 2—2, Fig. 1. Fig. 3 is a face view of a focusing glass and frame. Fig. 4 is a top view of an arm and shutter operating device attached thereto. Fig. 5 is a front view of the camera. Fig. 6 is a front view of a filmholder used in such camera. Fig. 7 is a transverse vertical section of a film-holder. Fig. 8 is a horizontal longitudinal section of a film-holder.

Similar letters of reference designate corresponding parts in all the figures.

A designates the body of the camera. It has any suitable frame work, as, for example, one consisting of a segmental top plate $a'$, a similarly shaped bottom plate $a^2$, side pieces $m^3$, $m^4$, extending between the top and bottom pieces, near the rear edges thereof and affixed thereto, so as to sustain them in their proper relative positions.

Between the side pieces $m^3$, $m^4$, and adjacent to or formed in the top and bottom pieces $a'$, $a^2$, are slideways $a^5$, $a^6$, which are curved longitudinally to correspond with the curved rear edges of the segmental top and bottom pieces.

Between the front edges of the segmental top and bottom pieces, a focusing chamber B is pivotally supported, as for example, by means of pivots $b$, extending from a plate $b'$, attached to such focusing chamber and entering bearings formed in the segmental top and bottom pieces $a'$, $a^2$, or extensions thereof.

From the side pieces $m^3$, $m^4$, extends a flexible piece or curtain of rubber cloth or like material, $a^7$, whose outer edges are secured to the segmental top and bottom pieces $a'$, $a^2$, to the side pieces $m^3$, $m^4$, while its inner edges are secured to a plate $b^2$, which latter is attached to the focusing chamber B.

It will be seen by this construction that I produce a camera body which will be light tight except for an opening at the rear, which is intended to be closed, either by a focusing glass or a plate holder, and that such camera body admits of a swinging or oscillating movement of the focusing chamber B.

The focusing chamber B consists of two principal portions, a tube $b^3$, which is furnished with a lens and extends forwardly from the plate $b^2$, and a light funnel $b^4$, which extends rearwardly from said plate within the camera body; its rear edge being close to the slideways $a^5$, $a^6$. The part $b^4$ of the focusing chamber is wedge-shaped with a top and bottom which flare in a rearward direction, and sides which converge in a rearward direction. Fitted to its sides are plates $b^5$, $b^6$, which are capable of being adjusted rearwardly so as to extend to the inner surface of the slideways to exclude light entering the said rear section $b^4$ of the focusing chamber from the sides. As shown these plates $b^5$, $b^6$, are horizontally slotted and are fastened in place by screws $b^7$ passing through their slots and engaging with the sides of said section $b^4$ of the focusing chamber. The plates $b^5$, $b^6$ might, where the screws $b^7$ pass through them, be strengthened by plates $b^8$, $b^9$.

$a^3$ and $a^4$ represent sliding panels for observing the interior of the camera body.

As the pivots $b$ upon which the focusing chamber swings are located concentrically with the axis or center of the arc or curve in which the rear edges of the top and bottom pieces are formed, it is possible for the rear end of the focusing chamber to swing in close contact with the ground glass frame or a film-holder fitted in the slideways $a^5$ $a^6$.

C designates screws passing loosely through the plate $b'$ and engaging with tapped holes in the plate $b^2$. The lens tube $b^3$ is fitted to slide through an opening in plate $b'$. The light funnel $b^4$ is rigidly attached to the plate $b^2$. A spring $C'$ is interposed between the two plates, and it moves the plate $b^2$, and consequently the entire focusing chamber, as far backward as the screws C will permit. Therefore, by manipulating the screws, the focusing chamber may readily be adjusted forward and backward.

D designates a focusing plate provided with a ground focusing glass $d$. The frame is of a size to fit into the slideways $a^5$, $a^6$, in a vertical direction, but it is exceedingly narrow, so as to be merely large enough to extend across the rear end of the section $b^4$ of the focusing chamber B.

E designates a plate-holder, having a rectangular frame $e$, and a back $e'$, as also a slide $e^2$. The whole plate-holder is made longitudinally flexible, to the extent of enabling it to be either straightened or bent into a curve corresponding to the curve of the slideways $a^5$, $a^6$. This flexibility may be attained by forming the back and the frame of a number of vertically extending pieces or strips of wood, and attaching them to a woven fabric $f$, and the flexibility of the slide may be attained by making it of binders' board or analogous material.

G designates a shutter, which is here shown to consist of a rectangular piece with its lower edge semi-circular-shaped, pivoted by a pin or pins $g$ to the front end portion of the lens tube $b^3$. Above this pivot this shutter is provided with a hook-shaped arm $g'$, whence extends a cord $g^2$ which passes around pulleys $g^3$, $g^4$, and connects with a metal strip $g^5$. This metal strip is provided longitudinally with a row of holes, any one of which may be engaged with a pin $g^6$ on a lever $g^7$. This row of holes serves as a ready means for compensating for any change in the position of the cord, $g^2$ due to the adjustment backward or forward of the lens tube. This lever $g^7$ is fulcrumed by a pin $g^8$, and has a cam-shaped surface upon which a spring $g^9$ acts to normally hold the lever in such a position that the shutter may remain closed. The lever $g^{10}$ is fulcrumed by a pin $g^{11}$, and provided with an arm, which may be conveniently manipulated. It is engaged with a notch in the levers $g^7$, so as to be capable of oscillating this lever and thereby opening the shutter. The levers $g^7$ and $g^{10}$, as here shown are mounted upon an arm B', which is affixed to the upper pivot of the plate $b'$, and consequently serves as a means for swinging or oscillating the focusing chamber. The camera being suitably supported in such a position that the focusing chamber lies close to one side of the segmental camera body, and the center line of the same points in the direction of the object whose picture is desired, the plates $b^5$ and $b^6$ may be loosened by the screws $b^7$. A ground glass focusing plate may be then brought directly in the rear of the focusing chamber, the shutter G held back and the screws C adjusted until the image is approximately focused upon the focusing plate. Plates $b^5$ and $b^6$ are now slid back, excluding light from the sides, the focusing chamber readjusted until the image is properly focused upon the plate, when the screws $b^7$ are tightened. The ground glass holder is now slid out of the slideways $a^5$ and $a^6$ and the plate or film-holder inserted in its place. The proper stop or diaphragm, and the shutter G being in their proper places in the lens tube $b^3$, the slide $e^2$ is withdrawn from the holder E and the shutter lifted by its lever $g^{10}$ for the exposure, and then dropped. The focusing chamber is turned to a new position by the arm B', the shutter again lifted and a new exposure made upon another plate or film within the holder E, and so on until the desired number of exposures have been made.

If a continuous film or sensitized plate is inserted in the holder E, and the chamber oscillated from one end of its travel to the other while the shutter is held up, it is obvious that a continuous panoramic view will be taken. The exposed plates or films are then treated according to the usual photographic methods.

What I claim as my invention, and desire to secure by Letters Patent, is—

1. The combination with a segmental camera body, of a focusing chamber having an oscillating or swinging connection therewith, an arm for oscillating said focusing chamber, a shutter and means carried by said focusing chamber operating arm for controlling the shutter, substantially as specified.

2. The combination with a segmental camera body, of a focusing chamber having an oscillating or swinging connection therewith, an arm attached to one of the pivots of the oscillating focusing chamber, a shutter connected with the lens tube, pulleys supported to move with the oscillating focusing chamber and arm, a cord passing round said pulleys, and a lever mounted on the arm for operating said cord, substantially as specified.

3. The combination with a segmental camera body, of a focusing chamber having oscillating or swinging connection therewith, an arm attached to one of the pivots of the oscillating focusing chamber, a shutter connected with the lens tube, pulleys supported to move with the oscillating focusing chamber and arm, a cord passing round said pulleys, a lever mounted on the arm for operating said cord, and an adjustable connection between said cord and lever, substantially as specified.

4. The combination with a camera body of a focusing chamber independent of said camera body and having an oscillating or swinging connection therewith, a plate $b^2$, rigidly connected with said focusing chamber, a plate $b'$, through which the lens tube may slide, and means coacting with said plates for adjusting the focusing chamber longitudinally relatively to the camera, substantially as specified.

5. The combination with a camera body of a focusing chamber independent of said camera body and having an oscillating or swinging connection therewith, a plate $b^2$, rigidly connected with said focusing chamber, a plate $b'$, through which the lens tube may slide, and a screw co-acting with said plates for adjusting the focusing chamber longitudinally relatively to the camera, substantally as specified.

6. The combination with a camera body of a focusing chamber independent of said camera body and having an oscillating or swinging connection therewith, a plate $b^2$, rigidly connected with said focusing chamber, a plate $b'$, through which the lens tube may slide, and a screw and spring co-acting with said plates for adjusting the focusing chamber longitudinally relatively to the camera, substantially as specified.

In testimony whereof I have signed my name to this specification in the presence of two subscribing witnesses.

MATHIAS FLAMMANG.

Witnesses:
H. LITTLEJOHN,
D. VAN NAME.